United States Patent [19]

Kennedy et al.

[11] 4,362,628
[45] Dec. 7, 1982

[54] METHOD AND APPARATUS FOR CLEANING BASINS

[75] Inventors: Alvin B. Kennedy, Alvin; Bertram M. Leecraft, Houston, both of Tex.

[73] Assignee: Methods Engineering, Inc., Angleton, Tex.

[21] Appl. No.: 240,418

[22] Filed: Mar. 4, 1981

Related U.S. Application Data

[63] Continuation-in-part of Ser. No. 171,362, Jul. 23, 1980, abandoned, which is a continuation-in-part of Ser. No. 36,345, May 7, 1979, abandoned.

[51] Int. Cl.³ .............................................. C02F 1/52
[52] U.S. Cl. .................................. 210/712; 210/787; 210/804; 210/805; 210/806; 210/167; 210/195.1; 210/202; 210/512.2; 261/DIG. 11; 423/573 R; 423/578 R
[58] Field of Search .......... 261/3, DIG. 11, DIG. 46; 134/10, 109, 111; 210/631, 696, 702, 712, 787, 804, 805, 806, 167, 169, 780, 785, 195.1, 200, 201, 202, 241, 242.1, 257.1, 304, 512.1, 512.2; 423/573 R, 574 L, 578 R

[56] References Cited

U.S. PATENT DOCUMENTS

| | | |
|---|---|---|
| 2,597,728 | 5/1952 | Hink .................................. 210/242.1 |
| 2,668,796 | 2/1954 | Wehmiller ........................... 210/785 |
| 2,703,748 | 3/1955 | Clarke ................................. 210/202 |
| 3,207,310 | 9/1965 | Yesberger .......................... 210/257.1 |
| 3,265,212 | 8/1966 | Bonsall ............................... 210/257.1 |
| 3,289,775 | 12/1966 | Stone ................................... 175/66 |
| 3,299,619 | 1/1967 | Terry ........................... 261/DIG. 46 |
| 3,341,983 | 9/1967 | Baldenhofer ......................... 210/167 |
| 3,366,247 | 1/1968 | Visman ............................... 210/512.2 |
| 3,386,588 | 6/1968 | Ades .................................. 210/512.2 |
| 3,397,139 | 8/1968 | Sak ..................................... 210/631 |
| 3,456,797 | 7/1969 | Marriott ............................. 210/195.1 |
| 3,540,588 | 11/1970 | Estabrook ......................... 210/195.1 |
| 3,596,769 | 8/1971 | Baldwin .............................. 210/512.1 |
| 3,616,917 | 11/1971 | Hellwege ............................. 210/167 |
| 3,840,120 | 10/1974 | Greenberg ........................... 210/167 |
| 4,040,864 | 8/1977 | Steeves .............................. 210/242.1 |
| 4,110,218 | 8/1978 | Marriott ............................. 210/257.1 |
| 4,141,101 | 2/1979 | Gibellina ............................. 210/169 |

OTHER PUBLICATIONS

Betz Handbook of Industrial Water Conditioning 7th Edition, 1976, pp. 47, 48, 254.

*Primary Examiner*—Ernest G. Therkorn
*Attorney, Agent, or Firm*—Guy E. Matthews

[57] ABSTRACT

Apparatus for cleaning sediment from basins comprises a suction system that withdraws particulate-laden liquid from the bottom of the basin. A pump providing the suction transports the particulate-laden liquid to a first vessel or catch tank where primary settling of the particulate can occur. A second pump withdraws particulate laden liquid from the catch tank and directs a high velocity flow of particulate laden coolant through separator apparatus for primary separation of particulate matter. The discharge of effluvia of the primary separator is conducted to a second vessel or tank. A third pump withdraws liquid from the lowermost portion of the second vessel and forces a high velocity flow through a secondary system for further separation of particulate matter from the liquid. The discharge of the second separator system is conducted to a third vessel or tank. A fourth pump withdraws liquid from the bottom of the third vessel and forces a high velocity flow through a tertiary separator system for yet further separation of particulate matter from the liquid. The discharge from the tertiary separator is conducted to a fourth vessel. A fifth pump withdraws cleaned liquid from the lowermost portion of the fourth vessel and conducts the cleaned liquid back to the basin.

44 Claims, 8 Drawing Figures

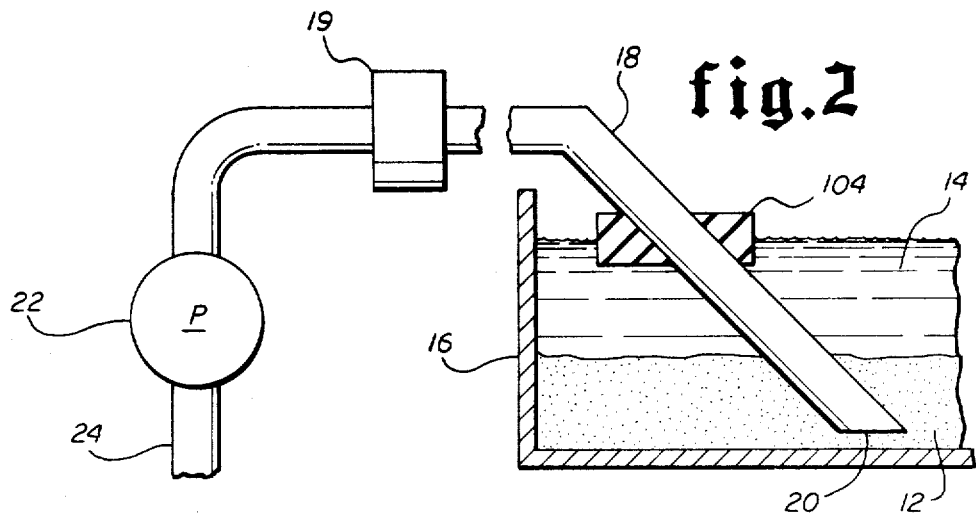
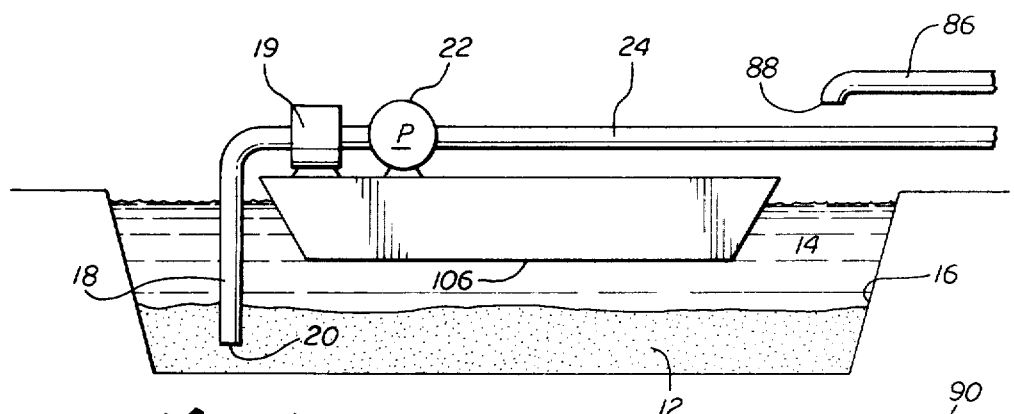
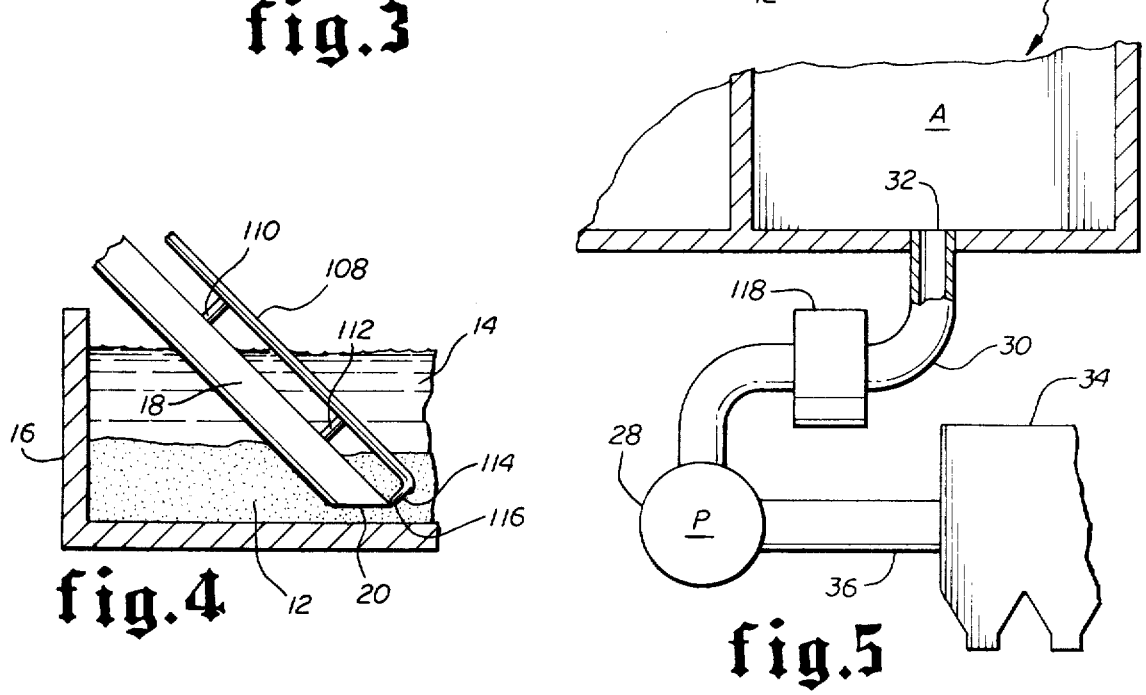

METHOD AND APPARATUS FOR CLEANING BASINS

This application is a Continuation-in-part of application Ser. No. 171,362, filed July 23, 1980, which is a Continuation-in-Part of application Ser. No. 036,345, filed May 7, 1979, both now abandoned.

FIELD OF THE INVENTION

This invention relates generally to methods of and apparatus for separating solids from liquids and more particularly to a system for selectively or continously accomplishing cleaning of cooling tower basins, sulfur conversion units, API separators, waste ponds, and the like.

BACKGROUND OF THE INVENTION

There are numerous situations and processes in which liquids that collect or are stored or used in basins accumulate or become contaminated with sediments. One common situation is in the case of cooling tower basins. A cooling tower is a structure over which circulated water that is to be reused as a coolant is trickled, or flowed for the purpose of reducing the temperature of the water by partial evaporation. A cooling tower basin is a sump or volumetric container for the circulated water which has flowed or trickled from the top of the cooling tower to the lowest part thereof. The walls of cooling tower basins are typically constructed of concrete and provide a basin depth typically varying from about three feet to about thirty feet. From the basin, the "cooled" water flows to the suction side of a pump, or a plurality of pumps, that forces the water under pressure through a variety of heat exchangers for which cooling is desired. The heated water from the heat exchangers is then conducted to the uppermost portion of the cooling tower and is deposited on the cooling tower in a spray or distributed in a manner so as to enhance temperature reduction by a partial evaporation. The function of cooling water is thermodynamic. Water from the cooling tower transits through heat exchangers, either interiorally or exteriorally of typical heat exchanger tubing, where it absorbs heat from substances having higher temperatures, which substances are typically gaseous or liquid. After this transit, the heated water is returned to the upper portion of the cooling tower and descends by gravity through the cooling tower structure, whereupon the water is cooled in readiness for another cooling cycle.

The efficiency of the cooling tower water function is inversely proportional to its temperature; i.e. the lower the temperature of the cooling water, the higher the efficiency of heat exchange with its exchange medium. In other words, the greater the temperature difference between the cooling water and its exchange medium, the more enhanced is the thermodynamic effect of the process. There are many natural and understood phenomena which degrade the efficiency of cooling water by increasing its temperature; and thereby decreasing the difference in temperature between it and its exchange medium. One of these efficiency degrading phenomena is corrosion and erosion of piping in the flow process which result in the deposition of ferrous or ferric materials in the water. These ferrous or ferric materials cause the water to retain heat and thereby preclude desired reduction in temperature as the water descends through a cooling tower system.

The chemical composition of the water as it emanates from its original source is also an efficiency degrading phenomenon, whether that source be from sub-surface aquafers; from rivers, stream, bayous, etc. For adequate efficiency, the water should be as free as possible from chemical compositions that degrade the heat exchange efficiency thereof during a cooling cycle.

In some cases, water treating chemicals are added into the cooling water stream to precipitate undesirable solids and to maintain the hydrogen ion number so that the solution is neither excessively acidic nor basic. Such treating water chemicals can interfere with the heat exchange efficiency of the water.

Virtually all cooling towers are located in open areas and are therefore susceptible to deposit of contaminants, such as wind-carried dust, silt, sand, etc., that enter the cooling tower basin and reduce the convective and conductive cooling of the water as it circulates through the heat exchanger or descends through the cooling tower. It is important to note that the depositions of these various sediments in the cooling tower basin accrue incrementally over a long period of time and result in a considerable decrease in the efficiency of the thermodynamic system. For this reason, it is necessary from time to time to remove these efficiency degrading contaminants from the cooling tower basin.

In the past, and currently, the general methods of cleaning sediment from cooling tower basins included cleaning of the cooling tower basin with the water removed from the basin and manual cleaning of the basin after the water has been removed. In one case, the cooling tower is taken out of service and "free" water is drained from the cooling tower basin. After this has been accomplished, laborers or divers enter the basin with shovels, scoops or other implements and manually remove the sediment to containers placed outside the basin wall. In another case, laborers or divers enter the basin with vacuum hoses and cause the sediment to be "sucked out" to liquid vacuum trucks which transport the sediment to a "dump site" for ultimate disposal.

The above methods or cleaning cooling tower basins are extremely costly to the system in that the cooling tower system and the heat exchanger equipment serviced thereby, i.e., the heat exchange complex, must be shut down during the period that basin cleaning operations are being conducted. The resulting discontinuance of the operation of petrochemical systems during this period can result in lost revenues amounting to tens of thousands of dollars per day and cessate during that period of time delivery of energy materials to the marketplace. Additionally, all of the chemically treated water drained from the basin must be transported to a site for safe ultimate disposal. A substantial volume of the water treating chemicals is lost and must be replaced, thereby resulting in considerable expense to the overall heat exchange process and thereby adversely affecting the competitive nature of the particular process involved.

Another method for accomplishing cleaning of cooling tower basins is typically conducted under conditions where the cooling tower remains in service and laborers or divers enter the basin with vacuum hoses and cause the sediment and a considerable amount of chemically treated water to be transferred to vacuum trucks. These trucks then deliver the effluent to a safe "dump site" for ultimate disposal. Here again, as mentioned above, a considerable amount of expensive water treating chemicals becomes lost in the cleaning process.

It is desirable to provide a cooling tower cleaning process that enables the heat exchange system, the cooling tower and the process to continue under normal production and allows effective cleaning to promote efficient thermodynamic effect without the necessity for laborers or divers to enter the cooling tower basin and conduct cleaning operations.

According to conventional practice, when hauled to a dump site by a truck, effluent having a low viscosity is subject to a sudden shift of position as the truck abruptly turns, stops or starts, thereby causing difficult steering or even overturn of the truck; a problem the present invention has remedy for.

Another situation where sediments collect is in the oxidizing basins of sulfur conversion units, which are also known as tail gas conversion units. The units are used to remove sulfur from tail gas by a method sometimes called the "Stretford Holmes Process". The units use a liquid known as Stretford solution and the sulfur is carried by the Stretford solution through an oxidizing basin, which is a large convernous basin, to a froth pit. During operation of the unit, larger sulfur particles do not retain enough velocity to go through the unit to the froth pit. These large particles of sulfur settle to form a sediment in the oxidizing basin. As the sediment collects in the basin, the available volume of Stretford solution for use in the process is reduced, thereby making the process less efficient. Also, since the Stretford solution is very expensive, it is economically wasteful to have substantial volumes of the solution tied up as sediment.

Another situation that involves the accumulation of sediments is in oilfield reserve pits and waste ponds. Such pits and ponds contain all manner of chemical, industrial and petroleum wastes, which are environmentally detrimental. Methods have been suggested for treating the water in such pits and ponds, but mere water treatment does not eliminate or even deal with sediments.

It is therefore, a feature of the present invention to provide an improved method and apparatus for the separation of liquids from solids and for the safe disposal of the separated solids.

It is also a feature of the present invention to provide a novel method and apparatus for accomplishing cleaning of cooling tower and sulfur conversion unit basins while allowing tower and unit to remain in operation during the cleaning process.

It is also a feature of this invention to provide novel apparatus and method for removing sediment from cooling tower and sulfur conversion unit basins without necessitating entry of laborers into the cooling tower basin where such personnel might be subject to hazardous chemicals.

It is an even further feature of the present invention to provide a novel method and apparatus for accomplishing cleaning of basins where loss of liquid is maintained at a minimum during the cleaning process.

It is another feature of the present invention to provide a novel method and apparatus for cleaning cooling tower systems and sulfur conversion units whereby cleaning operations can be conducted on a frequent basis and the cooling tower water can be maintained at optimum thermodynamic efficiency.

Another feature of this invention is to provide a method to improve the safe hauling of effluent.

Other and further objects, advantages and features of the invention will become obvious to one skilled in the art upon an understanding of the illustrative embodiment about to be described and various advantages referred to herein will occur to one skilled in the art upon employment of the invention in practice.

SUMMARY OF THE INVENTION

The present invention is directed to the provision of a method and apparatus for accomplishing cleaning of basins containing liquid and sediment. The sediment and debris that settle at the bottom of the basin are withdrawn by suction apparatus incorporating a pump that withdraws by suction a quantity of sediment-laden liquid from the bottom of the basin. This sediment-laden liquid is pressurized by the pump and is transmitted through conduits to a first vessel or catch tank having an outlet at the lower portion thereof. A second pump is arranged with its suction communicated with the bottom outlet of the catch tank and the second pump forces the sediment-laden liquid from the catch tank through a primary separator which may conveniently take the form of a hydrocyclone separator bank incorporating a plurality of hydrocyclone separators. Although this invention is discussed herein in conjunction with hydrocyclone separators that perform the solid separation function, such is not intended to limit the invention in any manner whatever. It is within the spirit and scope of this invention to employ other separation means as well. A small amount of water is discharged along with separated solids from the primary separator to a receptacle after which a coagulant may be mixed with the sludge so as to stabilize it for transport, all of which is then transported to a dump site. Alternatively, the sludge may be concentrated by removing the liquid therefrom. The partially cleaned liquid discharged from the primary separator is then transported to a second tank or vessel also having an outlet opening at the lower portion thereof. A third pump withdraws liquid from the bottom of the second vessel and forces this liquid through a secondary separator apparatus which may also take the form of a hydrocyclone bank. Again, the sludge discharged from the secondary separator may be processed as above. The liquid exiting the secondary separator will then be conducted to a third tank or vessel. The liquid from the third vessel may be processed through a tertiary separator to remove additional quantities of solids, with the liquid from the tertiary separator being transported to a fourth vessel. The clean liquid is then transported from the fourth vessel by a pump and conduit system back to the basin.

The four vessels are so related that a balanced fluid system will exist. Weirs are provided on the second, third and fourth vessels to allow excess liquid in the second vessel to flow to the first vessel or catch tank. Excess liquid in the third vessel will flow over the weir to the second vessel or catch tank. Likewise, liquid from the fourth vessel will flow to the third. There is provided, therefore, an integrally balanced fluid flow system in volume of liquid flow.

The sediment cleaning system of this invention may incorporate a debris trap for the purpose of intercepting solid contaminants such as insects, cellophane, wood fragments, etc. that might be present in the basin, thus protecting the separator system from blockage by such debris.

The sediment cleaning system of this invention may also incorporate a vibrating screen unit for removing smaller particles of sand or the like so as to reduce wear on pumps and other equipment.

It may also be desirable to provide storage (settling) tanks, electrostatic precipitators, vacuum conveyors, etc. in the event it is desired that minute clarification of the water be accomplished prior to returning the cleaned cooling water to the basin.

The suction device for removing sediment from the bottom of the basins may incorporate ballast or float devices. Also, portions of the system may be barge mounted for use in cleaning ponds, lakes and bays.

In the event it is desired, an injection pump may be provided for injecting flocculents into the flow stream in the liquid transfer line between the catch tank and the second pump. In this manner, settling of the solids in the effluent can be accelerated through the separation cycle and the first separator bank can be rendered more effective in separating solid particulate that might otherwise pass on further into the separation system.

BRIEF DESCRIPTION OF THE DRAWINGS

In order that the manner in which the above recited advantages and features of the invention are attained as well as others which will become apparent can be understood in detail a more particular description of the invention briefly summarized above may be had by reference to the specific embodiment thereof which is illustrated in the appended drawings, which drawings form a part of this specification. It is to be understood, however, that the appended drawings illustrate only a typical embodiment of the invention and therefore are not to be considered limiting of its scope, for the invention may admit to other equally effective embodiments.

IN THE DRAWINGS

Figure 1:
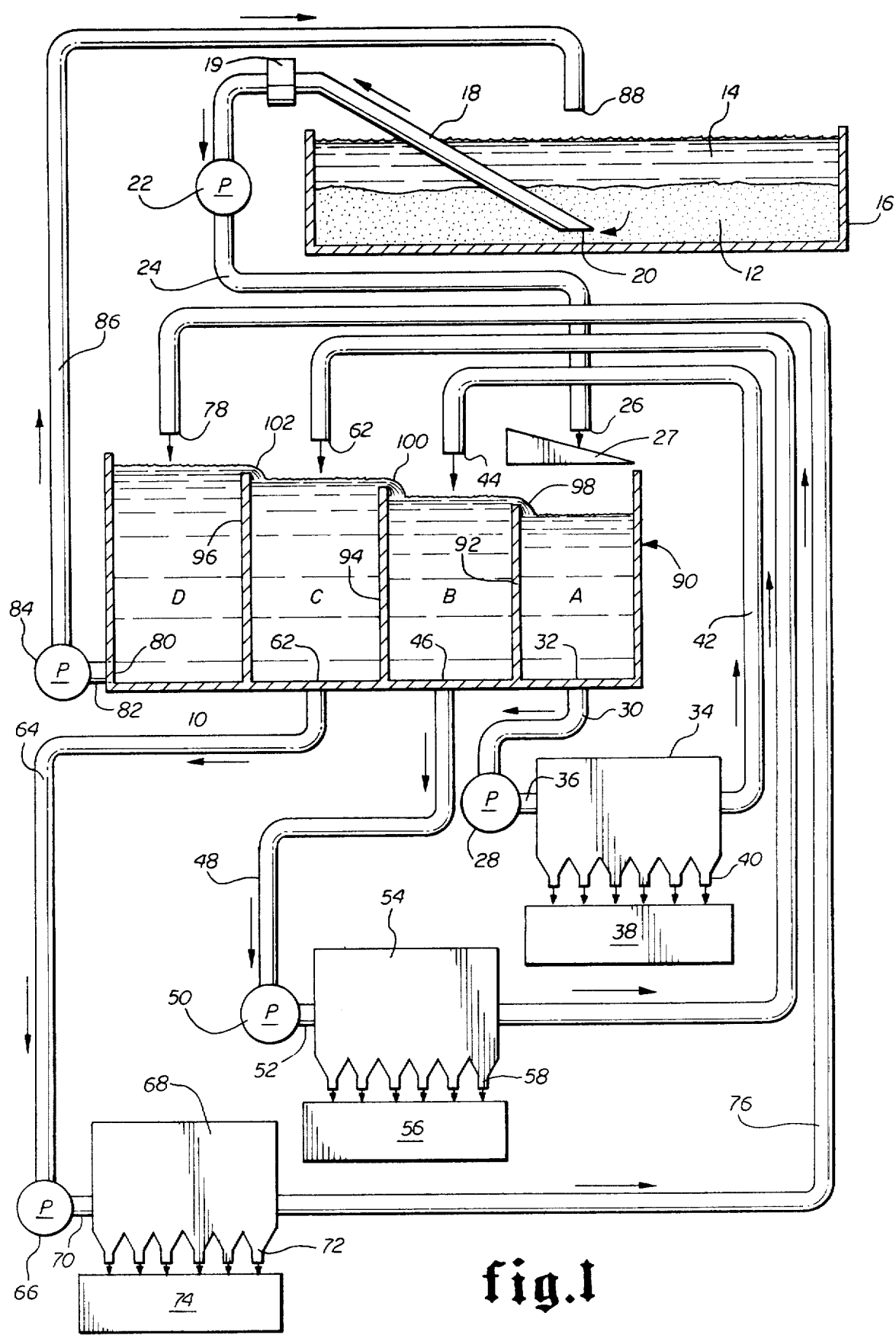

FIG. 1 is a schematic illustration of a cleaning system for separation sediment from liquids in basins in accordance with the teachings of the present invention.

FIG. 2 is a partial schematic illustration representing a modified embodiment of this invention incorporating a debris trap and suction flotation and movement system.

FIG. 3 is a partial schematic illustration representing an embodiment of the invention wherein certain elements are barge mounted for use in cleaning ponds, lakes and bays.

FIG. 4 is a partial schematic illustration representing means for agitating sediment for more effective pickup of material.

FIG. 5 is a partial schematic illustration representing a further modified embodiment of this invention incorporating a flocculent injector for injection of flocculent material into the flow stream proceeding primary solid separation.

Figure 6:
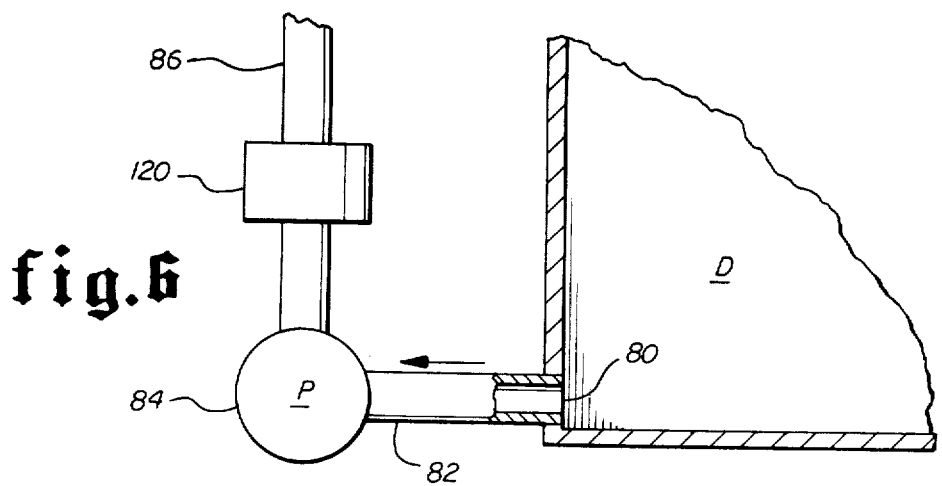

FIG. 6 is a fragmentary schematic illustration also representing a modified embodiment of this invention wherein minute clarification of the liquid may be accomplished by means of settling tanks, electrostatic precipitators, vacuum conveyors and the like.

Figure 7:
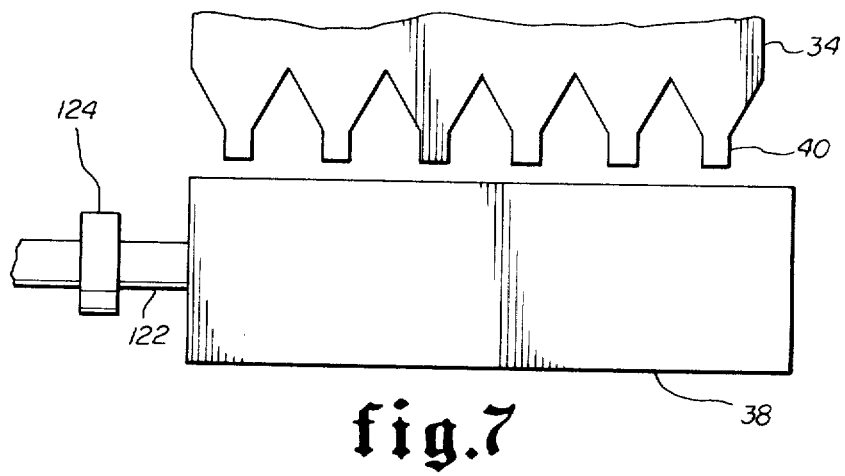

FIG. 7 is a partial schematic illustration of means for introducing a coagulant into the sludge to increase the viscosity thereof for safe transport to a dump site.

Figure 8:
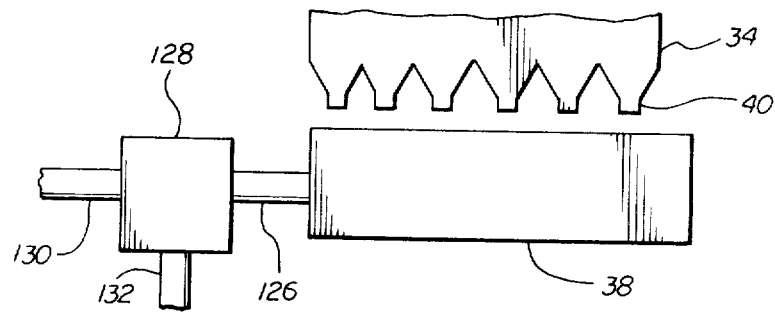

FIG. 8 is a partial schematic illustration of means for concentrating the sludge and recovering the liquid therefrom.

DETAILED DESCRIPTION OF THE PREFERRED EMBODIMENT

Referring now to the drawings, and first to FIG. 1, a cleaning system is illustrated generally at 10 which is provided for the purpose of removing sediment 12 from liquid 14 contained within a basin 16. In the broadest aspect of the present invention, basin 16 may be any container adapted to receive liquid and sediment. In one aspect of the present invention, basin 16 is a cooling tower basin adapted to receive cooling water and sand, silt, and sludge. In another aspect of the present invention, basin 16 is an oxydizing basin of a sulfur conversion unit adapted to receive Stretford solution and sulfur particles. Basin 16 may also, however, be an A.P.I. separator or even a lake or pond of water or other fluid having layers of sediment, which might include almost any thing, on its bottom.

System 10 may conveniently take the form illustrated in FIG. 1 of the drawings where a suction conduit, designated generally by the numeral 18, may be provided that is adapted to extend into basin 16 and present a suction opening 20 at or near the bottom of basin 16. A first pump 22 is provided having its suction side communicated with suction conduit 18 while the discharge side of pump 22 is communicated with a transfer conduit 24 having the outlet opening 26 thereof positioned for discharge of liquid into a first vessel or tank A, which may also be referred to as a catch vessel. When pump 22 is energized sediment 12 deposited at or near the bottom of basin 16, together with debris and other foreign matter, will be sucked into the conduit 18 and this sediment-laden liquid will be transported to and deposited in catch tank A. A screening basket 19 may be disposed in suction conduit 18 in order to remove from the liquid upstream of pump 22 solid debris such as insects, pieces of wood and other trash. Screening basket 19 functions to protect the various pumps and solid separators from being damaged or obstructed by debris other than sediment. Also, a vibrating screen 27 may be provided below outlet opening 26 in order to remove further trash. In the preferred embodiment, vibrating screen 27 is on the order of 20×20 mesh.

A second pump 28 is provided having the suction opening thereof communicated with a conduit 30 that is connected to catch tank A at a bottom outlet opening 32. The discharge side of the pump 28 is connected to a primary separator device 34 by means of a connection conduit 36. The primary separator device 34 may take any number of suitable forms, but for purposes of simplicity and understanding, is shown in the drawing to be in the form of a hydrocyclone bank including a plurality of hydrocyclone devices connected in serial relation and being adapted to separate particulate matter from the liquid being forced therethrough by the pump 28. The individual hydrocyclones of primary separator 34 are selected to remove particles above a certain size, such size being determined by the nature of the sediment and liquid. In the preferred embodiment of the present invention, primary separator 34 is adapted to remove particles larger than 50-74 microns in maximum diameter. Particulate matter separated by separator bank 34 is deposited in a waste receptacle 38 from the various outlet openings 40 of the separator bank. The separated particulate matter exits the separator discharge openings 40 along with a small quantity of liquid and this waste material may be disposed of or processed further, as will be set forth in greater detail hereinafter. As pump 28 forces the mixture of liquid and sediment from vessel A through the bank 34 of solid separators, this bank of separators removes substantially all of the particles above a certain size together with a small amount of liquid.

The discharge from separator bank 34 of liquid and smaller particulate matter is conducted via a conduit 42 to a discharge outlet 44 that is positioned for discharge of the partially cleaned liquid into a second vessel B. This second vessel, which may be separate from vessel A or interconnected with vessel A in compartment form, is also provided with a bottom outlet opening 46 that is disposed in communication with a suction conduit 48 to a third pump 50. A discharge conduit 52 of the pump 50 transmits pressurized water from the pump into a secondary solid separator 54 which may conveniently take the form of a hydrocyclone bank as shown, or any other suitable form within the spirit and scope of this invention. In the preferred embodiment, secondary separator 54 is adapted to remove from the liquid particles greater than about 10 microns in maximum diameter. As pump 50 forces the material withdrawn from vessel B into secondary separator 54, substantially all of the particulate matter not removed by separator bank 34 will be separated and will be discharged into a receptacle 56 from a plurality of separator discharge outlets 58. A small quantity of liquid is discharged from the outlet 58 along with the particulate matter, which again may be processed further or disposed of.

The discharge of secondarily separated liquid from secondary separator 54 is transported by means of a conduit 60 having its discharge opening 62 positioned to deposit liquid into a third vessel C. While the secondarily separated liquid in vessel C is substantially clean, and in certain aspects of the present invention clean enough for return to basin 16, in other aspects of the present invention tertiary solid separation may be necessary. Accordingly, vessel C includes a bottom outlet 62 that communicates with a conduit 64. Conduit 64 is connected to the suction side of a fourth pump 66, the discharge side of which is connected by a conduit 70 to a tertiary solid separator 68. In the preferred embodiment, tertiary solid separator 68 includes a bank of hydrocyclones adpated to remove particles larger than about 3 microns in maximum diameter. Particulate matter separated by tertiary separator 68 along with a small quantity of liquid is discharged through a plurality of discharge openings 72 into a waste receptacle 74 for disposal or further processing.

The liquid discharged from tertiary separator 68, which is free of particulte matter larger than about 3 microns and is therefore substantially free of particulate matter, is conducted via a conduit 76 of an outlet 78 positioned to discharge fluid into a receiving vessel D. Vessel D is formed to define a bottom outlet opening 80 that is communicated with a suction conduit 82 of a fifth pump 84. The discharge side of the pump 84 is connected to a transfer conduit 86 having its outlet opening 88 positioned for discharge of cleaned water back into basin 16.

Vessels A, B, C and D may be individual vessel structures if desired, or, in the alternative, may take the form of a four-compartment vessel such as illustrated generally at 90 in the drawings. Vessel 90 may include intermediate partitions 92, 94 an 96 that cooperate to define four separate and distinct internal compartments A, B, C and D. The compartment walls 92, 94 and 96 are formed to define internal weirs 98, 100 and 102, respectively, that are so designed that the liquid flow in system 10 is balanced. Any excess liquid within the vessel D will flow into the upper portion of vessel C. Likewise, excess partially clarified liquid within vessel C will flow over weir 100 into the vessel B, and excess liquid in vessel B will flow over weir 98 into vessel A, thereby creating a system of flow which is integrally balanced in volume of liquid flow.

System 10 may, if desired, be provided in the form of portable vehicle mounted equipment that may be positioned in close proximity to a particular basin requiring cleaning and the suction conduit 18 may simply be introduced into the basin and manipulated in any suitable manner so as to accomplish removal of accumulated sediment. Also, if desired, the system illustrated in FIG. 1 may conveniently take the form of a permanent installation provided for the purpose of accomplishing continuous or intermittent cleaning of one or more basins that may be located in close proximity to one another. Appropriate suction conduits may extend to and be associated with respective ones of the basins involved and a valved suction manifold may provide for selective communication with respective ones of the cooling tower basins as cleaning is desired, all as would be apparent to one skilled in the art.

Referring now particularly to FIG. 2, an alternate schematic embodiment of the invention is shown wherein the suction conduit 18 is provided with a suitable flotation device 104 that allows suction conduit 18 to be "floated" within basin 16, thereby facilitating the movement of suction conduit 18 over the bottom of basin by personnel or by any suitable mechanical means. It is therefore unnecessary for personnel to enter basin 16 and be subjected to the hazardous effects of any chemical materials that may be therein. Through utilization of the present invention it is not necessary to place laborers or divers into the basin during the cleaning process due to the fact that suction of sediments from the basin is conducted and controlled remotely from outside the basin. This aspect is very definitely advantageous from an occupational health and safety consideration as compared to current methods wherein service personnel can be exposed to the liquid and its various chemical constituents.

Referring now to FIG. 3, there is illustrated the use of the system of the present invention wherein basin 16 is generally a waste pond, which may specifically be an oil field reserve pit, a chemical dump, or the like. In any event, basin 16 is a body of water, ranging in size from a small pool to a large lake or bay, having a layer of sediment 12 on the bottom thereof. Since basin 16 may be quite large, a work barge 106 is provided for the support of personal and various components of system 10. Screening basket 19 and pump 22 are supported on barge 106 and conduit 24 is adapted to be connected to the remainder of system 10 located on the land adjacent basin 16. Suction conduit 18 is adapted to depend from barge 106 to withdraw sediment 12 from the bottom of basin 16 through inlet 20. Inlet 20 may be provided with cutters or the like to assist in the removal of sediment. Barge 106 may be moved about the surface of basin 16 thereby to substantially completely remove the sediment on the bottom. The liquid 14, which is water, is cleaned in the manner described above and the clean water is returned to basin 16 via conduit 86 through discharge outlet 88. Thus the system of the present invention provides a method and apparatus for cleaning waste ponds.

Referring now to FIG. 4, there is illustrated an embodiment of the system that is particularly useful in the cleaning of sulfur conversion units, wherein the sediment, which consists primarily of solid sulfur, is at times difficult to put into suspension with the Stretford solution, which forms the liquid.

Basin 16 is the oxydizing basin of the sulfur conversion unit. Large particles of sulfur having insufficient velocity to be processed through the unit settle out of the Stretford solution 14 and accumulate as sediment 12. In order to agitate sediment 12 to be more readily sucked into inlet 20, a small conduit 108 is mounted as by standoffs 110 and 112 to suction conduit 18. The end of conduit 108 is fitted with a flexible hose 114 having a nozzle 116. Hose 114 is fitted to direct a stream of air or Stretford solution pumped through conduit 108 through nozzle 116 towards inlet 20. The air or Stretford solution is pumped at a high velocity and thereby causes hose 114 to whip violently in the vicinity of inlet 20 to agitate the sediment.

In using the system of the present invention to clean water, as for example cooling tower waste or waste pond it may be desirable to inject flocculent material into the flow stream so as to enchance initial solids separation and clarification of water by primary solid separator 34. As shown in FIG. 5, a flocculent injector illustrated schematically at 118 may be placed in the suction conduit 30 for injection of flocculent material into the flow stream flowing from the catch vessel A. Pump 28 will accomplish thorough mixing of the flocculent materials prior to primary clarification of the water by primary separator 34. There is a variety of well known commercially available flocculent materials that accellerate the "settling" of solids in the effluent through the separation cycle. The selection of the chemistry of the flocculent material must, of course, be compatible with the chemistry of the water in the basin.

Referring now to FIG. 6, it may be desirable to provide for minute clarification of the liquid to be returned to the basin following tertiary separation. An alternative embodiment of the present invention, therefore, may include settling tanks, electrostatic precipitators, vacuum conveyors, etc. which are illustrated schematically at in communication with the discharge conduit extending from pump 84.

As mentioned previously, the particulate material and liquid collected in waste receptacles 38, 56 and 74 is either processed further or disposed of. In the cases where the system of the invention is used to clean cooling tower basins, waste ponds, or other basins where the liquid is water, the material in receptacles 38, 56 and 74, is a sludge of sand, silt and other solids, and water. Since water is usually abundant, the water may be disposed of as part of the sludge.

The most convenient method of sludge disposal is simply to load the sludge into trucks for transportation to a suitable dump site. However, due to the water content of the sludge, it may be desired to introduce a coagulant material into the sludge to increase the viscosity of the sludge to prevent shifting or sloshing that could result in loss of control of the truck. As illustrated in FIG. 7, receptacle 38 is provided with a waste conduit 122 having therein a chemical injector 124. Any of several well known coagulants may be introduced via chemical injector 124 into waste conduit 122, thereby to increase the viscosity of the sludge. It will be understood that a similar conduit and injector may be used with receptacles 56 and 74.

In certain situations, it may be desirable to concentrate the sludge by removing therefrom as much liquid as possible. This is particularly desirable in the sulfur conversion unit basin cleaning embodiment of the system of the present invention, where the Stretford solution is valuable and should be recovered. However, it is also desirable where dump site volume is limited or the volume of waste otherwise must be left to a miniumum. Referring to FIG. 8, there is illustrated apparatus for recovering liquid and concentrating the sludge. A waste discharge conduit is provided for the removal of sludge from receptacle 38. A centrifuge 128 is connected to receive sludge through conduit 126 and discharge concentrated sludge through a dump 132 and liquid through a conduit 130. Conduit 130 may be arranged to return liquid to basin 16.

It is therefore apparent that the present invention is one well adapted to attain all of the objects and advantages hereinabove set forth, together with other advantages which will become obvious and inherent from a description of the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit or scope thereof, it is to be understood that all matters hereinabove set forth are shown in the accompanying drawings are to be interpreted as illustrative and not in any limiting sense.

What is claimed is:

1. A method for cleaning a cooling tower basin to remove particulate matter and debris from the water thereof, said method comprising:
   transporting water and sediment from the bottom of said basin;
   subjecting said water to primary solid separation to remove sand and debris and most of the silt and sludge therefrom;
   transporting said primarily separated water to receiving vessel;
   withdrawing water from the bottom of said receiving vessel;
   subjecting said withdrawn water to secondary solid separation to remove substantially all of said silt and sludge therefrom;
   transporting said secondarily separated water back to said cooling tower basin;
   depositing water and sediment in a catch vessel;
   withdrawing water and sediment from the lower portion of said catch vessel prior to said primary solid separation;
   introducing flocculent material into said sediment-laden coolant water prior to primary solid separation;
   separating any debris from said coolant water prior to said primary solid separation; and
   further clarification of coolant water being returned to said cooling tower basin, said further clarification being accomplished by any one of a number of further clarification processes including settling, electrostatic precipitation and vacuum conveying.

2. The method of claim 1, wherein:
   said primary solid separation is accomplished by forcing sediment-laden coolant water from said catch vessel through a primary bank of solid separators wherein sand and silt separated from the cooling water are discharged for disposal along with a small quantity of coolant water.

3. The method of claim 2, wherein:

all solid particulate larger than about 74 microns and a substantial amount of solid particulate smaller than about 74 microns is separated from said coolant water by said primary solid separator.

4. The method of claim 2, wherein:
said secondary solid separation is accomplished by forcing coolant water from said receiving vessel through a secondary bank of solid separators wherein silt and sludge solid particulate is discharged for disposal along with a small quantity of coolant water.

5. The method of claim 4, wherein:
said secondary solid separation accomplishes separation of about 95% of the silt and sludge remaining in said cooling water after primary solid separation.

6. The method of claim 1, including prior to transporting said secondarily separated water back to said cooling tower basin, the step of subjecting said secondarily separated water to tertiary solid separation.

7. The method of claim 1, further comprising:
introducing a coagulant to the sediment after separation of the sediment from the water being returned to the cooling tower.

8. Apparatus for cleaning sediment from cooling tower basins and separating sediment including solid particulate from water utilized for heat exchange processes, said apparatus comprising:
a plurality of liquid receiving vessels;
first transfer means for removing sediment and water from the lower portion of a cooling tower basin and transporting sediment-laden water to a first one of said receiving vessels;
first solid separator means receiving sediment-laden water from said first receiving vessel, separating a substantial amount of solid particulate from said water and depositing said separated particulate for disposal, said first solid separator means transporting the cleaned fluid discharge therefrom to a second one of said receiving vessels;
second solid separator means receiving solid particulate-laden partially cleaned water from said second receiving vessel, separating substantially all of the solid particulate contained within said partially cleaned water and depositing said solid separated particulate for disposal; and
cleaned fluid return means receiving cleaned water discharged from said second solid separator and returning said cleaned water to said cooling tower basin;
said cleaned fluid return means being:
a third one of said water receiving vessels receiving the cleaned water discharge of said second solid separator means; and
a pump energized return conduit communicating with said third water receiving vessel and discharging said cleaned water into said cooling tower basin;
said first and second solid separator means being:
first and second banks of separators connected in receiving relation, respectively, to said first and second water receiving vessels;
said first transfer means being:
a suction conduit having a suction inlet being positionable within said cooling tower basin with the suction outlet positioned at least near the bottom of said cooling tower basin:
a transfer conduit extending to said first water receiving vessel;
a pump interconnecting said suction and transfer conduits and being operable to impart a suction and water transfer flow in said suction and transfer conduits; and
flotation and directing means being provided on said suction conduit means, allowing movement of said suction conduit means within said cooling tower basin by control externally of said cooling tower basin.

9. Apparatus for cleaning sediment as defined in claim 8, wherein:
weir means is provided on said second and third water receiving vessels, said weir means allowing any excess water of said third vessel to overflow into said second vessel and allowing any excess water in said second vessel to overflow into said first vessel.

10. Apparatus for cleaning sediment as defined in claim 9, wherein:
said plurality of water receiving vessels are compartments within a multi-compartment vessel.

11. Apparatus for cleaning sediment as defined in claim 10, wherein said first transfer means includes:
debris trap means for separating large contaminants and objects from water flowing through said suction conduit means.

12. Apparatus for cleaning sediment as defined in claim 11, wherein said apparatus includes:
flocculent injection means for introducing flocculent material into the coolant water prior to flow of said coolant water through said first solid separator means.

13. Apparatus for cleaning sediment as defined in claim 12, wherein said apparatus includes:
minute clarification means receiving the discharge of said second solid separator means and subjecting said discharge to further clarification treatment including at least one of a group of treatment methods, including settling, electrostatic precipitation and vacuum conveying.

14. Apparatus for cleaning sediment as defined in claim 11 further comprising:
one or more screens for separating sand and the like from water flowing through said suction conduit means.

15. Apparatus as defined in claim 8, including: a vibrating screen mounted above said first one of said receiving vessels to remove trash from the water and sediment deposited therein.

16. Method of cleaning a basin containing a liquid with particulate matter and debris therein, which comprises the steps of:
withdrawing liquid with said particulate matter and debris therein from the bottom of said basin;
separating said debris from said liquid and particulate matter withdrawn from said basin;
depositing said liquid and particulate matter after said debris separating step in a catch basin;
withdrawing from the lower portion of said catch basin said liquid and particulate matter;
subjecting said liquid and particulate matter withdrawn from said catch basin to primary solid separation to remove most of said particulate matter from said liquid, wherein said primary separation is accomplished by forcing said liquid withdrawn from said catch basin through a primary bank of solid separators wherein said particulate matter separated from said liwuid is discharged along with a small quantity of said liquid;

removing substantially all of said liquid from said particulate matter separated in said primary separation step, thereby to concentrate said particulate matter;

depositing said primarily separated liquid to a receiving vessel;

withdrawing said primarily separated liquid from the lower portion of said receiving vessel;

subjecting said liquid withdrawn from said receiving vessel to secondary separation to remove substantially all of said particulate matter therefrom;

and transporting said secondarily separated liquid back to said basin.

17. The method as claimed in claim 16, including the step of:

returning the liquid removed from said particulate matter to said basin.

18. The method of claim 16, wherein:

all particulate matter larger than about 74 microns and a substantial amount of particulate matter smaller than about 74 microns is separated from said liquid by said primary separation.

19. The method of claim 16, wherein:

said secondary solid separation is accomplished by forcing liquid from said receiving vessel through a secondary bank of solid separators wherein said particulate matter is discharged for disposal along with a small quantity of liquid.

20. The method of claim 16, including the further step of removing substantially all of said liquid from said particulate matter separated in said secondary separation step, thereby to concentrate said particulate matter.

21. The method of claim 20, including the step of:

returning the liquid removed from said particulate matter to said basin.

22. The method of claim 16, wherein:

said secondary solid separation accomplishes separation of about 95% of said particulate matter remaining in said liquid after primary separation.

23. The method as claimed in claim 16, including prior to transporting said secondarily separated liquid back to said basin the further step of subjecting said secondarily separated liquid to tertiary solid separation.

24. The method as claimed in claim 16, wherein said liquid is water.

25. The method as claimed in claim 16, wherein said basin includes a pond.

26. The method as claimed in claim 16, including the step of agitating the particulate matter and debris on the bottom of the basin to aid in the withdrawing thereof from said bottom of said basin.

27. Apparatus for cleaning sediment from liquid containing basins and separating sediment including solid particulate matter from the liquid, said apparatus comprising:

a plurality of liquid receiving vessels;

first transfer means for removing sediment and liquid from the lower portion of a basin and transporting sediment-laden liquid to a first one of said receiving vessels, first bank of solid separators means for receiving sediment-laden liquid from said first receiving vessel, separating a substantial amount of solid particulate from said liquid and collecting said separated particulate, said first bank of solid separators means transporting partially cleaned liquid discharged therefrom to a second one of said receiving vessels;

means for removing substantially all of the liquid from said solid particulate separated by said primary bank of solid separators means, thereby to concentrate said solid particulate;

second bank of solid separators means for receiving solid particulate-laden partially cleaned liquid from said second receiving vessel, separating further solid particulate contained within said partially cleaned liquid and collecting said solid separated particulate; and cleaned liquid return means for receiving cleaned water discharged from said second bank of solid separators means and returning said cleaned liquid to said basin;

said first transfer means including:

a suction conduit having a suction inlet positionable within said basin at least near the bottom of said basin;

a transfer conduit extending to said first liquid receiving vessel;

and a pump interconnecting said suction and transfer conduits and being operable to impart a suction in said suction conduit and liquid transfer flow transfer conduit.

28. Apparatus for cleaning sediment as defined in claim 27, wherein:

weir means is provided on said second and third liquid receiving vessels, said weir means allowing any excess liquid of said third vessel to overflow into said second vessel and allowing any excess liquid in said second vessel to overflow into said first vessel.

29. Apparatus for cleaning sediment as defined in claim 27, wherein:

said plurality of liquid receiving vessels are compartments within a multi-compartment vessel.

30. Apparatus for cleaning sediment as defined in claim 27, wherein said first transfer means includes:

debris trap means for separating large contaminants and objects from liquid flowing through said suction conduit means.

31. Apparatus for cleaning sediment as defined in claim 27, including:

minute clarification means for receiving the liquid discharge of said second solid separator means and subjecting said liquid discharge to further clarification treatment including at least one of a group of treatment methods, including settling, electrostatic precipitation and vacuum conveying.

32. Apparatus for cleaning sediment as defined in claim 27, further comprising:

means for separating small debris from liquid flowing through said suction conduit means.

33. The apparatus as claimed in claim 32, wherein said means for separating small debris includes a vibrating screen separator.

34. The apparatus as claimed in claim 27, including means for removing substantially all of the liquid from said solid particulate separated by said secondary solid separator means, thereby to concentrate said solid particulate.

35. The apparatus as claimed in claim 27, wherein said clean liquid return means includes:

a third receiving vessel for receiving liquid from said second solid separator;

third solid separator means for receiving liquid from said third receiving vessel, separating further solid particulate from said liquid and collecting said separated solid particulate;

and means for collecting and return to said liquid discharged from said third solid separator means.

36. The apparatus as claimed in claim 35, wherein said liquid collecting means includes a fourth receiving vessel.

37. The apparatus as claimed in claim 36, wherein said plurality of liquid receiving vessels are compartments within a multi-compartment vessel.

38. The apparatus of as claimed in claim 36, including weirs between said compartments wherein excess liquid from said fourth vessel may overflow into said third vessel, excess liquid from said third vessel may overflow into said second vessel, and excess liquid from said second vessel may overflow into said first vessel.

39. The apparatus as claimed in claim 27, including a barge for supporting said suction conduit and said pump.

40. The apparatus as claimed in claim 27, including: means for agitating said sediment within said basin to put said sediment into suspension in said liquid.

41. The apparatus as claimed in claim 40, wherein said agitating means includes:
a second conduit mounted with said suction conduit having an end positioned adjacent the suction inlet of said suction conduit;
a flexible hose attached to said end of said second conduit and directed substantially toward said suction inlet;
and means for forcing fluid through said second conduit and flexible hose to cause said hose to whip about.

42. The apparatus as claimed in claim 41, including a nozzle attached to said hose.

43. The apparatus as claimed in claim 27, including means for injecting flocculent material into said sediment-laden liquid received by said first solid separator means.

44. Method of cleaning a sulfur conversion unit oxidation basin containing sulfur conversion solution with particulate sulfur therein, which comprises the steps of:
withdrawing sulfur conversion solution with said particulate sulfur therein from the bottom of said oxidation basin;
depositing said sulfur conversion solution and particulate sulfur withdrawn from said oxidation basin in a catch basin;
withdrawing from the lower portion of said catch basin said sulfur conversion solution and particulate sulfur;
subjecting said sulfur oxidation solution and particulate sulfur withdrawn from said catch basin to a primary bank of solid separators to remove most of said particulate sulfur from said sulfur oxidation solution;
depositing said primarily separated sulfur oxidation solution in a receiving vessel;
withdrawing said primarily separated sulfur oxidation solution from the lower portion of said receiving vessel;
subjecting said sulfur oxidation solution withdrawn from said receiving vessel to a secondary bank of separators to remove substantially all of said particulate sulfur therefrom;
and transporting said secondarily separated sulfur oxidation solution back to said oxidation basin.

* * * * *